US010055387B2

(12) United States Patent
Shankar

(10) Patent No.: US 10,055,387 B2
(45) Date of Patent: Aug. 21, 2018

(54) MULTI-LEVEL CUSTOMIZABLE PAGINATION

(71) Applicant: Accenture Global Services Limited, Dublin (IE)

(72) Inventor: Subramanyam Shankar, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 505 days.

(21) Appl. No.: 14/740,875

(22) Filed: Jun. 16, 2015

(65) Prior Publication Data
US 2016/0224518 A1 Aug. 4, 2016

(30) Foreign Application Priority Data

Jan. 29, 2015 (IN) .............................. 417/CHE/2015

(51) Int. Cl.
*G06F 17/27* (2006.01)
*G06F 17/21* (2006.01)
*G06F 3/0482* (2013.01)

(52) U.S. Cl.
CPC .......... *G06F 17/217* (2013.01); *G06F 3/0482* (2013.01)

(58) Field of Classification Search
CPC ............. G06F 17/217; G06F 17/30554; G06F 17/30864; G06F 17/30905; G06F 17/30979; G06F 17/30991; G06F 17/30994; G06F 3/0485; G06F 3/0482
See application file for complete search history.

(56) References Cited

U.S. PATENT DOCUMENTS

| 8,812,977 | B2 | 8/2014 | Naderi | |
|---|---|---|---|---|
| 2006/0047649 | A1* | 3/2006 | Liang | G06F 17/30696 |
| 2007/0061303 | A1* | 3/2007 | Ramer | G06F 17/30864 |
| 2007/0150461 | A1* | 6/2007 | Weigel | G06F 17/30864 |
| 2011/0296321 | A1* | 12/2011 | Lord | G06Q 10/00 715/760 |
| 2014/0040228 | A1* | 2/2014 | Kritt | G06F 17/30554 707/706 |
| 2014/0136518 | A1* | 5/2014 | Shum | G06F 17/30991 707/722 |
| 2015/0006503 | A1* | 1/2015 | Cary | G06F 17/30867 707/710 |
| 2016/0092045 | A1* | 3/2016 | Lamas | G06F 3/0482 715/739 |

* cited by examiner

*Primary Examiner* — Wilson W Tsui
(74) *Attorney, Agent, or Firm* — Harrity & Harrity, LLP

(57) ABSTRACT

A device may receive a trigger to generate a pagination for a set of data entries. The device may determine a quantity of pagination levels associated with the pagination. The quantity of pagination levels may be two or more pagination levels. The device may determine a set of parameters associated with the pagination. The set of parameters may include a parameter for a pagination type for each pagination level of the two or more pagination levels. The device may paginate the set of data entries into a set of pages of the pagination based on the two or more pagination levels and the set of parameters. A data entry, of the set of data entries, may be placed into a page at a first pagination level of the two or more pagination levels. The device may cause the page, of the set of pages, to be displayed.

19 Claims, 10 Drawing Sheets

FIG. 5B

Window 522 (Page 1 of 200):

| Rank | Word | Type |
|---|---|---|
| 5 | a | art. |
| 422 | able | adj. |
| 58 | about | prep. |
| 307 | above | prep. |
| 177 | act | noun |

Window 524 (Page 52 of 200):

| Rank | Word | Type |
|---|---|---|
| 477 | dry | adj. |
| 976 | duck | verb |
| 356 | during | prep. |
| 49 | each | det. |
| 651 | ear | noun |

MULTI-LEVEL CUSTOMIZABLE PAGINATION

RELATED APPLICATION

This applications claims priority to Indian Patent Application No. 417/CHE/2015, filed on Jan. 29, 2015, the content of which is incorporated by reference herein in its entirety.

BACKGROUND

A developer may develop an application that includes a user interface for displaying a set of data entries. When the set of data entries satisfies a threshold quantity that may be displayed on a single page, the developer may opt to utilize a pagination of the set of data entries. The pagination may be a division of the set of data entries into one or more discrete pages with each page including a subset of the set of data entries. As a quantity of data entries increases, the quantity of pages is required to display the information may increase accordingly.

SUMMARY

According to some possible implementations, a device may include one or more processors. The one or more processors may receive a trigger to generate a pagination for a set of data entries. The set of data entries may satisfy a threshold quantity. The one or more processors may determine a quantity of pagination levels associated with the pagination. The quantity of pagination levels may be two or more pagination levels. The one or more processors may determine a set of parameters associated with the pagination. The set of parameters may include a parameter for a pagination type for each pagination level of the two or more pagination levels. The one or more processors may paginate the set of data entries into a set of pages of the pagination based on the two or more pagination levels and the set of parameters. A data entry, of the set of data entries, may be placed into a page at a first pagination level of the two or more pagination levels. The page at the first pagination level may be included in a set of pages at a second pagination level of the two or more pagination levels. The one or more processors may cause the page, of the set of pages, to be displayed.

According to some possible implementations, a computer-readable medium may store one or more instructions that, when executed by one or more processors, cause the one or more processors to determine a quantity of pagination levels associated with pagination. The quantity of pagination levels may be a set of pagination levels. The one or more instructions, when executed by one or more processors, may cause the one or more processors to determine a set of parameters associated with the pagination. The set of parameters may include a parameter for a pagination type for each pagination level of the set of pagination levels. The one or more instructions, when executed by one or more processors, may cause the one or more processors to paginate a set of data entries into a set of pages of the pagination based on the set of pagination levels and the set of parameters. A data entry, of the set of data entries, may be placed into a page at a first pagination level of the set of pagination levels. The page at the first pagination level may be included in a set of pages at a second pagination level of the set of pagination levels. The one or more instructions, when executed by one or more processors, may cause the one or more processors to cause the page, of the set of pages, to be displayed.

According to some possible implementations, a method may include receiving, by a device, a trigger to generate a pagination for a set of data entries. The set of data entries may satisfy a threshold quantity of data entries. The method may include determining, by the device, a quantity of pagination levels associated with the pagination. The quantity of pagination levels may be two or more pagination levels. The method may include determining, by the device, a set of parameters associated with the pagination. The set of parameters may include a pagination type for each pagination level of the two or more pagination levels. The method may include paginating, by the device, the set of data entries into a set of pages of the pagination based on the two or more pagination levels and the set of parameters. A data entry, of the set of data entries, may be placed into a page at a first pagination level of the two or more pagination levels. The page at the first pagination level may be included in a set of pages at a second pagination level of the two or more pagination levels. The method may include generating, by the device, program code associated with the pagination based on paginating the set of data entries.

BRIEF DESCRIPTION OF THE DRAWINGS

FIGS. 5A-5F are diagrams of an example implementation relating to the example process shown in FIG. 4.

DETAILED DESCRIPTION

The following detailed description of example implementations refers to the accompanying drawings. The same reference numbers in different drawings may identify the same or similar elements.

A developer may write program code for an application that may be utilized by a user. The application may include a user interface in which a set of data entries are displayed. When the set of data entries exceeds a threshold quantity that can be displayed on a single page, the developer may write program code for paginating the set of data entries rather than causing the set of data entries to be displayed as a continuous list, a scrolling list, or the like. When the application includes multiple modules (e.g., multiple test suites, multiple software components, multiple user interfaces, or the like), the developer may be required to develop a pagination for displaying the set of data entries in each module of the application.

However, development of the pagination may be time-consuming and prone to errors. Moreover, as a quantity of data entries increases, the quantity of pages required to display the set of data entries increases and/or the quantity of time required by a user of the application to locate a particular data entry, of the set of data entries, may increase accordingly. Implementations, described herein, may provide a reusable framework for generating a pagination with a configurable quantity of pagination levels. In this way, software development time may be decreased (e.g., as a result of reusability), computing performance may be improved (e.g., based on providing information for efficiently), and user experience may be improved (e.g., based on decreasing time required to located desired information) relative to a custom designed single level pagination.

Figure 1:
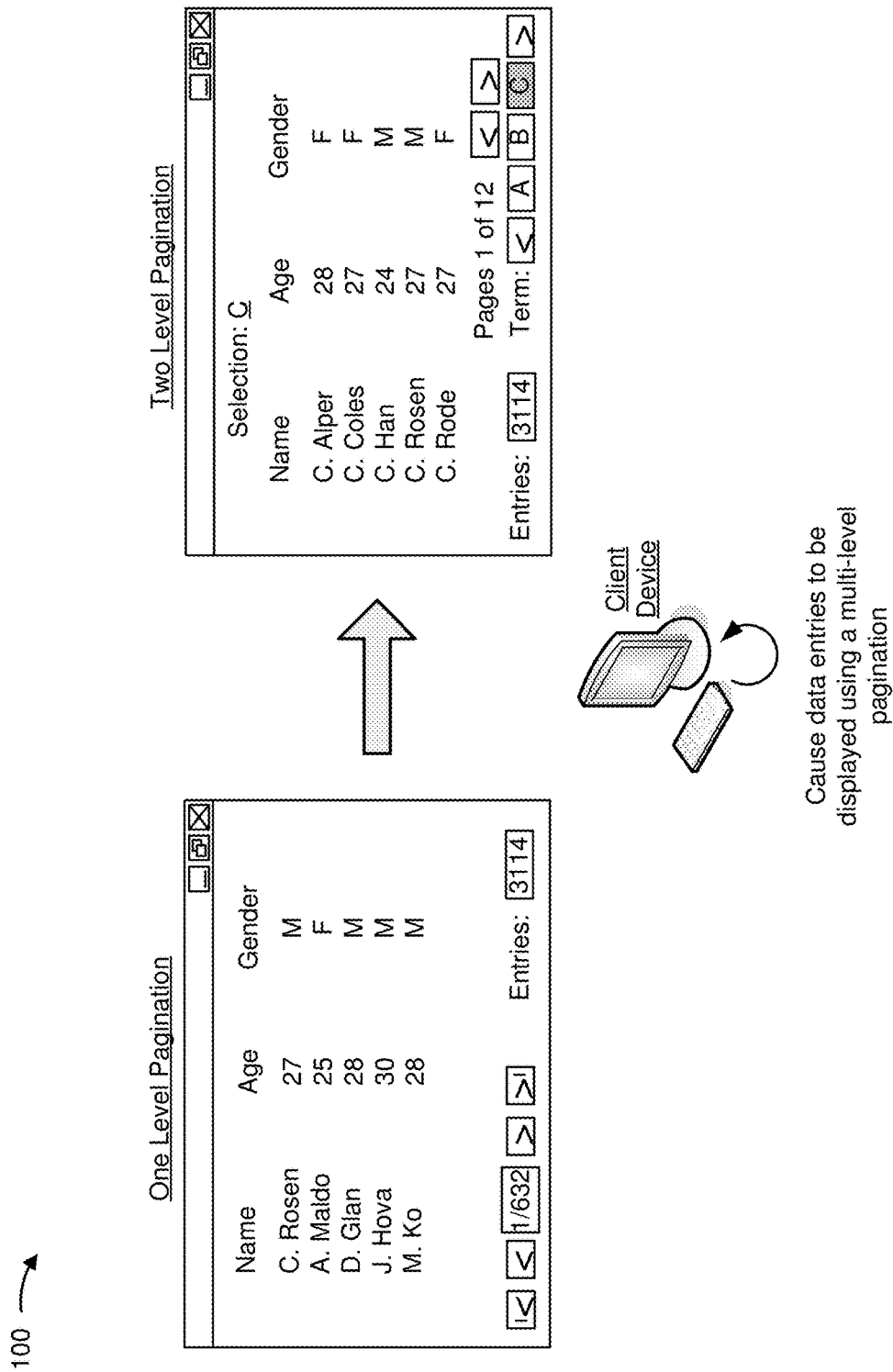
FIG. 1 is a diagram of an overview of an example implementation described herein.

FIG. 1 is a diagram of an overview of an example implementation 100 described herein. As shown in FIG. 1, a client device may generate, for display to a user, a user interface with which to view information. The information may include a set of data entries, which may include one or more fields (e.g., a "Name" field, an "Age" field, and a "Gender" field). When the quantity of data entries satisfies a threshold of quantity, the client devices may cause the set of data entries to be paginated into a pagination.

As further shown in FIG. 1, the set of data entries may be provided for display, by the client device in the user interface, using a "One Level" pagination. In the one level pagination, the set of data entries (e.g., a set of names, ages, and genders) are provided via a set of pages. For example, the set of data entries may be organized into a set of numerical pages (e.g., a first subset of data entries provided on a first page, a second subset of data entries provided on a second page, etc.). The user may interact with the user interface to view each page on which data entries are provided. For example, the client device may detect a user interaction with a button and provide a different page including a different subset of data entries based on detecting the user interaction. For the one level pagination, if the user desires to view a particular page including a particular subset of data entries, such as a subset of data entries for which names beginning with the letter "C," the user may lack information regarding the page on which this subset of data entries begins. In this case, the user may be required to perform multiple user interactions with a button to cause the client device to provide, for display, multiple non-desired pages until the particular page that is desired is provided by the client device, which may utilize more computing resources than a multi-level pagination to locate desired information.

To facilitate improved presentation of the set of data entries, relative to the one level pagination, the client device may receive a trigger to generate a multi-level pagination for the set of data entries based on a framework. For example, the client device may provide, to a developer, a user interface with which to request that the client device generate the multi-level pagination (e.g., based on a user interaction with the user interface or the like). The client device may determine a quantity of data entries in the set of data entries, and may determine that the quantity of data entries satisfies a threshold for providing a pagination for the set of data entries. The client device may determine a set of parameters associated with the framework for utilization in generating the pagination for the set of data entries. For example, the client device may determine one or more parameters associated with the pagination, such as a parameter associated with a quantity of pagination levels, a type of organization for each pagination level, an ordering for each type of organization, a data entry order for each data entry on a particular page, or the like. Additionally, or alternatively, the client device may determine one or more parameters associated with the user interface in which the pagination is provided, such as a parameter related to navigation of the user interface, a quantity of data entries to be provided on each page of the user interface, or the like. Based on the set of parameters, the client device may generate the multi-level pagination.

As further shown in FIG. 1, the set of data entries may be provided for display, by the client device in the user interface, using a "Two Level" pagination. In the two level pagination, the set of data entries (e.g., the set of names, ages, and genders) are provided via a group of sets of pages. For example, the client device may organize the set of data entries into a first level of pagination utilizing a group of letter sets of pages. In this case, the group of letter sets of pages may include a first set of pages for names starting with "A," a second set of pages for names starting with "B," a third set of pages for names starting with "C," or the like. Within a particular letter set of pages, at a second level of pagination, the set of data entries may be organized into a set of numerical pages. In this case, for the third set of pages for names starting with "C," the client device may provide a first page of the "C" set of pages, a second page of the "C" set of pages, or the like. For example, when 58 data entries are associated with first names starting with the letter "C" and the client device determines that the maximum number of data entries to be displayed per page is 5, the client device may subdivide the 58 data entries of the "C" set of pages into 12 numerical pages.

The client device may provide one or more elements of the user interface with which the user may interact to view the set of data entries via the two level pagination (or another multi-level pagination). For example, the client device may generate a set of page buttons for each numerical page of a particular letter set of pages. Further to the example, the client device may generate a group of letter buttons for the group of letter sets of pages.

The multi-level pagination may be reusable across multiple applications. For example, the client device may be configured to generate code for the multi-level pagination, create software artifacts for the multi-level pagination, or the like. In this way, the client device may reduce coding time and development errors relative to a developer being required to custom code pagination for an application that displays a set of data entries. Additionally, or alternatively, the multi-level pagination may facilitate improved contextual organization of the set of data entries, relative to a single level pagination, thereby reducing the quantity of instructions the client device is likely to receive from the user to cause the client device to display desired information. In this way, the client device may reduce processing cycles, required memory allocation, response time, or the like relative to a single level pagination.

Figure 2:
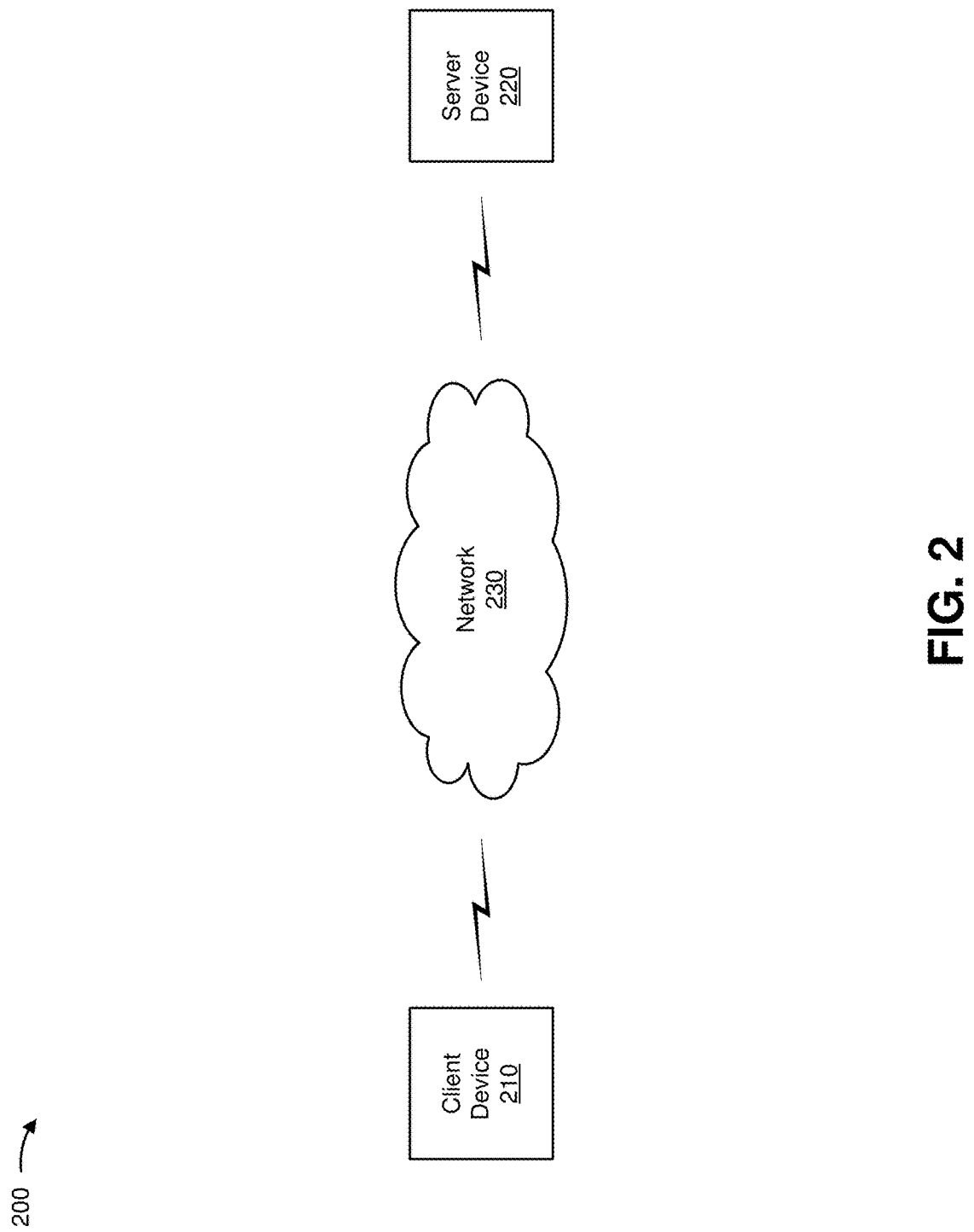
FIG. 2 is a diagram of an example environment in which systems and or methods, described herein, may be implemented.

FIG. 2 is a diagram of an example environment 200 in which systems and/or methods, described herein, may be implemented. As shown in FIG. 2, environment 200 may include a client device 210, a server device 220, and a network 230. Devices of environment 200 may interconnect via wired connections, wireless connections, or a combination of wired and wireless connections.

Client device 210 may include one or more devices capable of receiving, generating, storing, processing, and/or providing information associated with causing a set of data entries to be displayed using a multi-level pagination based on a framework for pagination. For example, client device 210 may include a communication and/or computing device, such as a mobile phone (e.g., a smart phone, a radiotelephone, etc.), a computer (e.g., a laptop computer, a tablet computer, a handheld computer, etc.), a gaming device, a wearable communication device (e.g., a smart wristwatch, a pair of smart eye glasses, etc.), or a similar type of device. In some implementations, client device 210 may provide a user interface with which to configure one or more parameters of the multi-level pagination. In some implementations, client device 210 may provide, for display, a set of data entries organized based on the multi-level pagination. In some implementations, client device 210 may receive information from and/or transmit information to another device in environment 200, such as server device 220.

Server device 220 may include one or more devices capable of storing, processing, and/or routing information associated with a multi-level pagination. For example, server device 220 may include a server that causes a set of data entries to be organized in a multi-level pagination based on framework for pagination. In some implementations, server device 220 may include a communication interface that allows server device 220 to receive information from and/or transmit information to other devices in environment 200, such as client device 210.

Network 230 may include one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these of other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, the two or more devices shown in FIG. 2 may be implemented within a single device, or a single device shown in FIG. 2 may be implemented as multiple, distributed devices. For example, although client device 210 and server device 220 are shown as two separate devices, client device 210 and server device 220 may be implemented within a single device. Additionally, or alternatively, a set of devices (e.g., one or more devices) of environment 200 may perform one or more functions described as being performed by another set of devices of environment 200.

Figure 3:
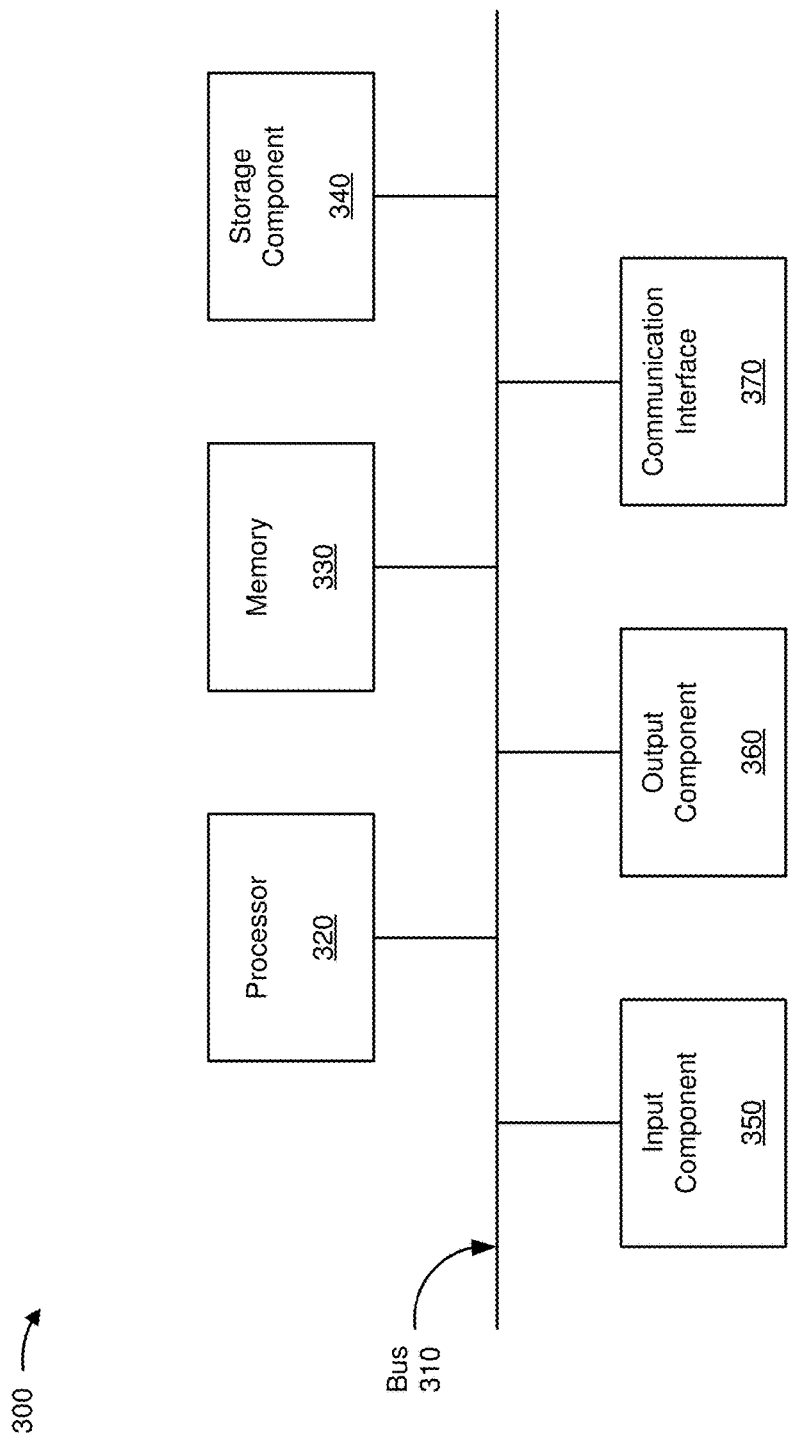
FIG. 3 is a diagram of example exponents of one or more devices of FIG. 2.

FIG. 3 is a diagram of example components of a device 300. Device 300 may correspond to client device 210 and/or server device 220. In some implementations, client device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include random access memory (RAM), a read only memory (ROM), and/or another type of dynamic or static storage device (e.g., a flash memory, a magnetic memory, an optical memory, etc.) that stores information and or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device to communicate with other devices, such as via a wired connection, a wireless connection, or a combination of wired and wireless connections. Communications interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as a memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
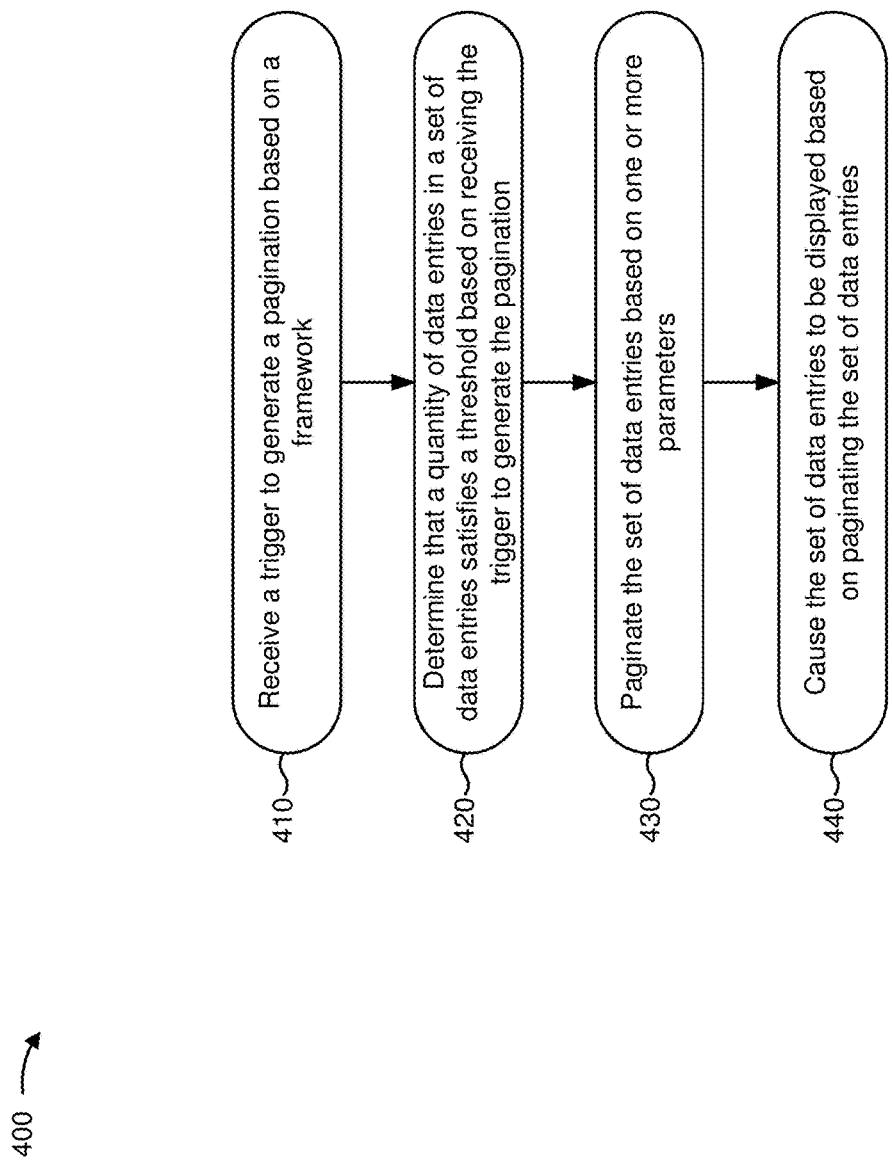
FIG. 4 is a flow chart of an example process for generating a multi-level pagination based on a framework for pagination.

FIG. 4 is a flow chart of an example process 400 for generating a multi-level pagination based on a framework for pagination. In some implementations, one or more process blocks FIG. 4 may be performed by client device 210. Additionally, or alternatively, one or more process blocks of FIG. 4 may be performed by another device or a set of devices separate from or including client device 210, such as a server device 220 or the like.

As shown in FIG. 4, process 400 may include receiving a trigger to generate a pagination based on a framework (block 410). For example, client device 210 may receive the trigger to generate the pagination. The pagination may refer to an organization of a set of data entries for display via a set of pages. For example, the pagination may include a first level of pagination with each page of the first level of pagination including a set of pages. Each page of the set of pages may be associated with a second level of pagination. A page may refer to a particular view, in a user interface, of a particular set of data entries (e.g., a subset of the set of data entries). The framework may refer to a set of configurable parameters, based on which client device 210 may generate program code associated with causing the pagination to be displayed (e.g., in a user interface of an application, in a review environment, or the like).

In some implementations, client device 210 may receive the trigger via a user interface interaction. For example, client drive 210 may provide a user interface with which a user may instruct client device 210 to cause a set of data entries to be provided for display in accordance with the pagination. Additionally, or alternatively, client device 210 may receive an instruction to generate program code for an application being developed by a developer.

In some implementations, client device 210 may receive the trigger based on an execution event. For example, when executing an application, the application may cause client device 210 to generate the pagination for a set of data entries associated with the application. Additionally, or alternatively, when compiling program code for an application, client device 210 may receive a trigger to generate the pagination. In some implementations, client device 210 may receive the trigger based on receiving a set of data entries. For example, client device 210 may receive a set of data entries from a data structure, another client device 210, or the like, and may determine to generate the pagination with which to cause the set of data entries to be displayed.

As further shown in FIG. 4, process 400 may include determining that a quantity of data entries in a set of data entries satisfies a threshold based on receiving the trigger to generate the pagination (block 420). For example, client device 210 may determine the quantity of data entries in the set of data entries. In some implementations, client device 210 may parse the set of data entries to determine the quantity of data entries. For example, when client device 210 receives a plaintext dataset that utilizes a first delimiter to identify a data entry and a second delimiter to identify a field of the data entry, client device 210 may parse the plaintext to determine the quantity of first delimiters, thereby determining the quantity of data entries.

In some implementations, client device 210 may determine a quantity of data entries that are to be displayed per page in the pagination to determine the threshold. For example, client device 210 may determine a quantity of data entries that are to be displayed per page based on a user indication, a size of a user interface in which a page will be provided for display, a quantity of data entries in the set of data entries, or the like. When the quantity of data entries in the set of data entries fails to exceed the quantity of data entries that are displayed per page, client device 210 may cause the set of data entries to be displayed without generating a pagination for the set of data entries. For example, client device 210 may provide all data entries of the set of data entries on a single page. In this way, client device 210 may avoid utilizing computing resources for organizing the set of data entries based on a set of levels of the pagination when the quantity of data entries does not exceed a threshold (e.g., a single page).

AS further shown in FIG. 4, process 400 may include paginating the set of data entries based on one or more parameters (block 430). For example, based on client device 210 determining that the quantity of data entries satisfies the threshold, client device 210 may paginate the set of data entries based on one or more parameters. In some implementations, client device 210 may configure the one or more parameters when generating the framework. For example, client device 210 may utilize stored information associated with the framework, information determined based parsing the set of data entries, or the like to determine the one or more parameters. In some implementations, client device 210 may determine the one or more parameters based on one or more fields of the set of data entries. For example, client device 210 may determine a quantity of levels of pagination (e.g., based on quantity of fields), an organization of the data structure (e.g., based on an alphabetical organization of a field), or the like based on the one or more fields of the set of data entries.

In some implementations, client device 210 may determine a parameter associated with a quantity of pagination levels when paginating the set of data entries based on one or more parameters. For example, client device 210 may determine a quantity of levels of the pagination based on a user indication, a quantity of fields associated with a data entry, or the like. In this case when the client device 210 determines, based on parsing the set of data entries, that each data entry is associated with a first field, a second field, and a third field, client device 210 may determine that a first pagination level is associated with the first field, a second pagination level is associated with the second field, and a third pagination level is associated with a third field. Additionally, or alternatively, client device 210 may determine that each data entry is associated with a single field, and may determine that a first pagination level is associated with a first organizational property of the first field (e.g., a first letter of a textual data entry first field) and a second pagination level is associated with a second organizational property of the first field (e.g., a second letter of textual data entry field).

In some implementations, client device 210 may determine a parameter associated with a pagination type for a pagination level when paginating the set of data entries based on one or more parameters. For example, client device 210 may determine the pagination type for each pagination level of the pagination generated when paginating the set of data entries. A pagination type may refer to a categorization based on which data entries, of the set entries, are organized into pages. For example, when the set of data entries includes a field including a set of numerical values, a pagination level may include a first page for odd numbers and a second page for even numbers. Similarly, when the set of data entries includes a field including a set of words, a pagination level may include a first page for words beginning with "A," a second page for words beginning with "B," or the like. Similarly, when the set of data entries includes a field including a set of test scores, a pagination level may include a first page for test scores between 100 and 90, a second page for test scores between 89 and 80, and a third page for test scores between 79 and 70, or the like.

In some implementations, client device 210 may determine an ordering for pages of a pagination level when paginating the set of data entries based on one or more parameters. For example, client device 210 may determine an order for each page of a particular pagination level. An ordering may refer to the order in which pages are presented. For example, when the pagination type is based on the first letter of a word in a field of a data entry, of the set of data entries, client device 210 may order the pages alphabetically (e.g., "A," "B," "C," etc.). Similarly, when the pagination type is based on the century in which a year occurs (the year being a field of a data entry of the set of data entries), client device 210 may order the pages chronologically (e.g., 19th century, 20th century, 21st century, etc.).

In some implementations, client device 210 may determine an ordering of data entries when paginating the set of data entries based on one or more parameters. For example, client device 210 may determine an order for each data entry of a set of pages of a pagination level. An order for each data entry may refer to the order in which each data entry is listed relative to one or more data entries associated with the same page. For example, when a data entry, of the set of data entries, includes a numerical aspect as a field of the data entry, client device 210 may order data entries, within a particular page, based on rank. Similarly, when a data entry, of the set of data entries, includes an alphabetical aspect (e.g., a word) as a field of the data entry, client device 210 may order data entries alphabetically within a particular page. Similarly, client device 210 may order data entries based on a category associated with a field, such as by dividing values of the field into incremental values, dividing words of the field into categories of words, utilizing a category defined by a field or the like. Additionally, or alternatively, client device 210 may determine the ordering based on a quantity of data entries associated with each page of a set of pages. For example, client device 210 may provide a first page before a second page when the first page includes more data entries, sub-pages, or the like than the second page.

In some implementations, client device 210 may paginate the set of data entries into the set of pages of two or more pagination levels based on the one or more parameters to generate a pagination for the set of data entries. For example, when three hierarchical pagination levels are selected, client device 210 may divide a set of data entries into a first subset of data entries, a second subset of data entries, a third subset of data entries, etc. at a first pagination level. Further to the example, client device 210 may divide the first subset of data entries (and the second subset of data entries, etc.) into a first sub-subset of data entries, a second sub-subset of data entries, etc. at a second pagination level. Further to the example, client device 210 may divide the first sub-set (and the second sub-subset, etc.), into a first page, a second page, etc. at a third pagination level. In this case, if the first sub-subset of data entries includes more data entries than are permitted on a single page, client device 210 may generate multiple pages for displaying the first subset of data entries. In this way, a set of pages may be established to hierarchically organize the set of data entries. By contrast, if the first sub-subset of data entries includes fewer data entries than are permitted on a single page, client device 210 may generate a single page for displaying all data entries of the first sub-subset of data entries.

As further shown in FIG. 4, process 400 may include causing the set of data entries to be displayed based on paginating the set of data entries (block 440). For example, client device 210 may cause the set of data entries to be displayed. In some implementations, client device 210 may generate program code to cause the set of data entries to be displayed. For example, client device 210 may generate program code that may be executed during execution of an application to facilitate utilization of the pagination in the application.

In some implementations, client device 210 may generate program code to cause the set of data entries to be paginated when the pagination is utilized by an application. For example, client device 210 may provide program code that facilitates the pagination being generated for the set of data entries when the pagination is desired for display. In this case, client device 210 may provide program code that may cause the set of data entries and/or a corresponding set of data entries to be displayed (e.g., a modified set of data entries, a similar set of data entries, or the like) using the pagination.

In some implementations, client device 210 may provide information associated with a user interface for the pagination for utilization by an application. For example, client device 210 may determine one or more parameters of a user interface in which the pagination is to be displayed, and provide program code associated with configuring the user interface.

In some implementations, client device 210 may propagate the program code to one or more modules of an application. For example, client service 210 may determine one or more modules of an application being developed by a developer for which the pagination is to be made available and the client device 210 may generate program code associated with facilitating access to the pagination by the one or more modules.

In some implementations, client device 210 may generate a user interface to cause the set of data entries to be displayed. For example, when an application in which the pagination is included is executed, client device 210 may cause a particular page to be displayed within a portion of a user interface of the application. In this case, client device 210 may generate the user interface to facilitate display of the particular page. Additionally, or alternatively, client device 210 may generate program code facilitating establishment of the user interface by another device such as another client device 210, server device 220, or the like, in a desktop environment, a web environment, a mobile environment, or the like.

In some implementations, client device 210 may determine a set of user interface layout parameters specifying a set of user interface elements associated with the user interface. For example, client device 210 may determine a set of buttons to provide, a set of indicators to provide, or the like. In some implementations, client device 210 may determine for which pages to display a button allowing navigation to a page. For example, when a pagination level is associated with a first letter of a word of a data entry, client device 210 may determine that a button for each letter of the alphabet be included in the user interface. In some implementations, client device 210 may determine that buttons for some of the letters of the alphabet be included in the user interface (e.g., letters that have data entries associated therewith, letters closest to the current page relative to other letters, or the like).

In some implementations, client device 210 may determine the one or more user interface elements to include in the user interface based on a size of display in which the user interface is to be displayed. For example, when the user interface is to be displayed on a first-sized display, client device 210 may determine to include a first quantity of navigation buttons and when the user interface is to be displayed on a second-sized display, client device 210 may determine to include a second quantity of navigation buttons.

In some implementations, client device 210 may monitor the user interface to detect a user interaction. For example, when providing the user interface in which the pagination is provided (e.g., a page of the pagination is provided with a set of user interface elements facilitating navigation to other pages of the pagination), client device 210 may monitor the user interface and update the page based on an interaction therewith. In this case, when a user selects a button, client device 210 may navigate to a page associated with the button, alter an appearance of the button (e.g., gray the button out to indicate a selection), alter which user interface elements are provided (e.g., re-label one or more buttons, remove one or more buttons, etc.), or the like.

In some implementations, client device 210 may generate a preview environment to cause the set of data entries to be displayed. For example, when a developer is utilizing client device 210 to develop an application that will include the pagination, client device 210 may generate a preview with which the developer may observe the pagination and alter one or more parameters to reconfigure the pagination to match a desired configuration.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5F are diagrams of an example implementation 500 relating to example process 400 shown in FIG. 4. FIGS. 5A-5F show an example of generating a multi-level pagination based on a framework for pagination.

Figure 5A:
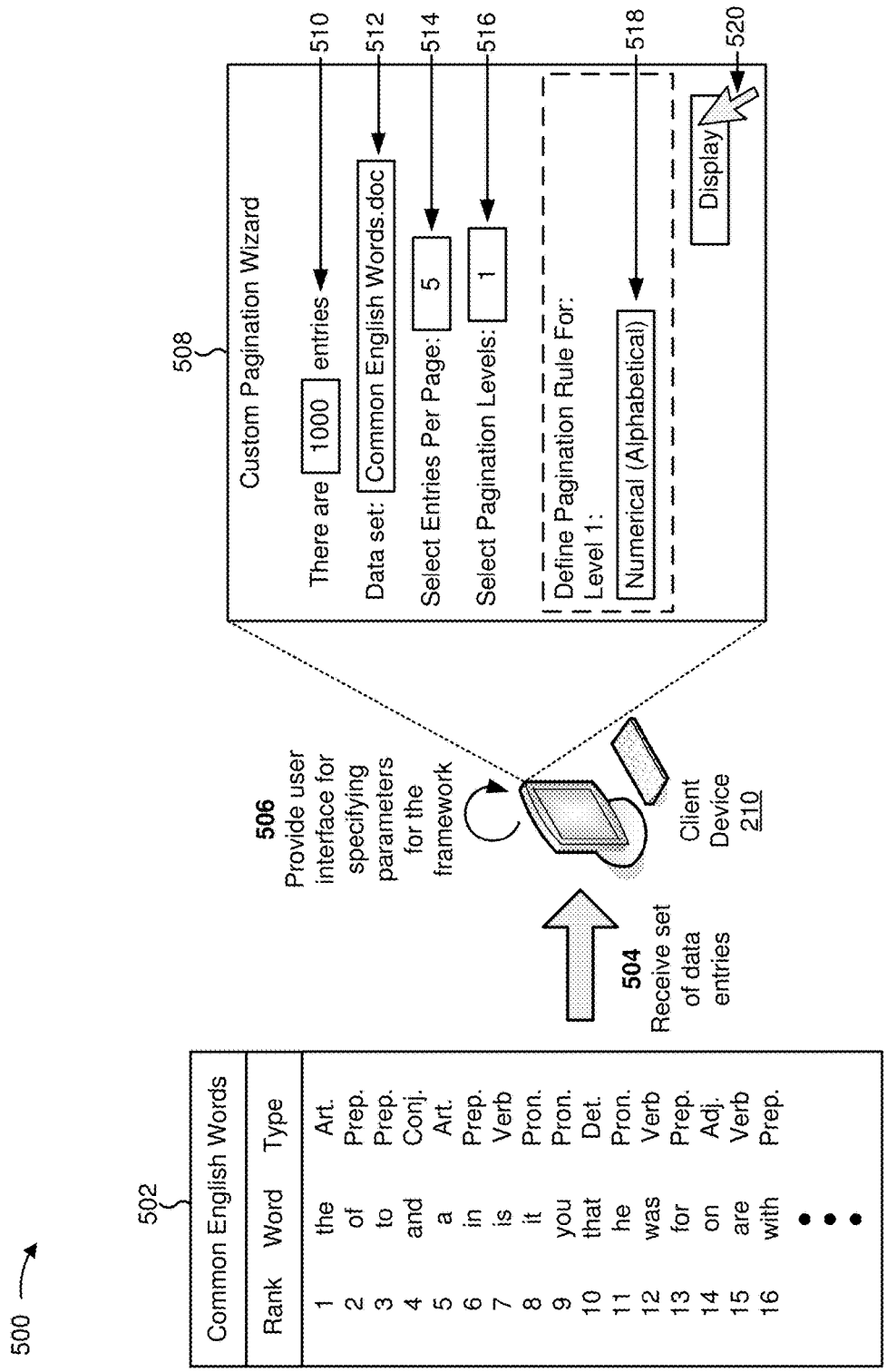

As shown in FIG. 5A, a set of data entries 502 (e.g., "Common English Words" and terms "data set 502") are loaded into client device 210, as shown by reference number 504. Data set 502 includes a set of fields, such as a rank field (e.g., "1," "2," etc.), a word field (e.g., "the," "of," etc.), and a type of fiend (e.g., "Art." For an article, "Prep." for a preposition, etc.). As shown by reference number 506, client device 210 provides a user interface 508 that identifies a set of parameters associated with generating a pagination for data set 502 and permits input for altering the set of parameters.

As further shown in FIG. 5A, and by reference number 510, client 210 provides an indication that data set 502 includes a particular quantity of data entries (e.g., 1000 data entries). As shown by reference number 512, client device 210 provides an indication of a name for data set 502. As shown by reference number 514, client device 210 provides an indication of a quantity of data entries that are to be displayed per page (e.g., 5). As shown by the reference number 516, client device 210 provides an indication of quantity of pagination levels (e.g., 1). As shown by reference number 518, client device 210 provides an indication of a parameter for generating the first pagination level (e.g., "Numerical (Alphabetical)"). Assume that the parameter indicates a numerical pagination (e.g., a first page, "1," a second page, "2," etc.), ordered numerically (e.g., 1, 2, etc.), with data entries ordered alphabetically within each page, based on the word field. As shown by reference number 520, based on a user interaction, client device 210 paginates data set 502 based on the parameter.

As shown in FIG. 5B, and by reference number 522, client device 210 provides a user interface for viewing data set 502 via the pagination generated based on the parameters. User interface view 522 shows a first page with data entries of data set 502 ordered alphabetically based on the word field. Client device 210 generates a set of user interface elements such as an indication of the current page provided (e.g., "1"), an indication of the total pages into which data set 502 is paginated (e.g., "200"), a "Go to" element (e.g., facilitating navigating to a particular page), a search element (e.g., facilitating search for a particular data entry), and a set of navigation buttons for traversing pages of the pagination. As shown by reference number 524, based on a user interacting with a user interface element, client device 210 provides another page of the pagination (e.g., page 52). The "Go to" element may include a text entry field for receiving a page identifier (e.g., an indication of a page which the user desires to be provided) and may identify a page based on the page identifier for display within the user interface.

Figure 5C:
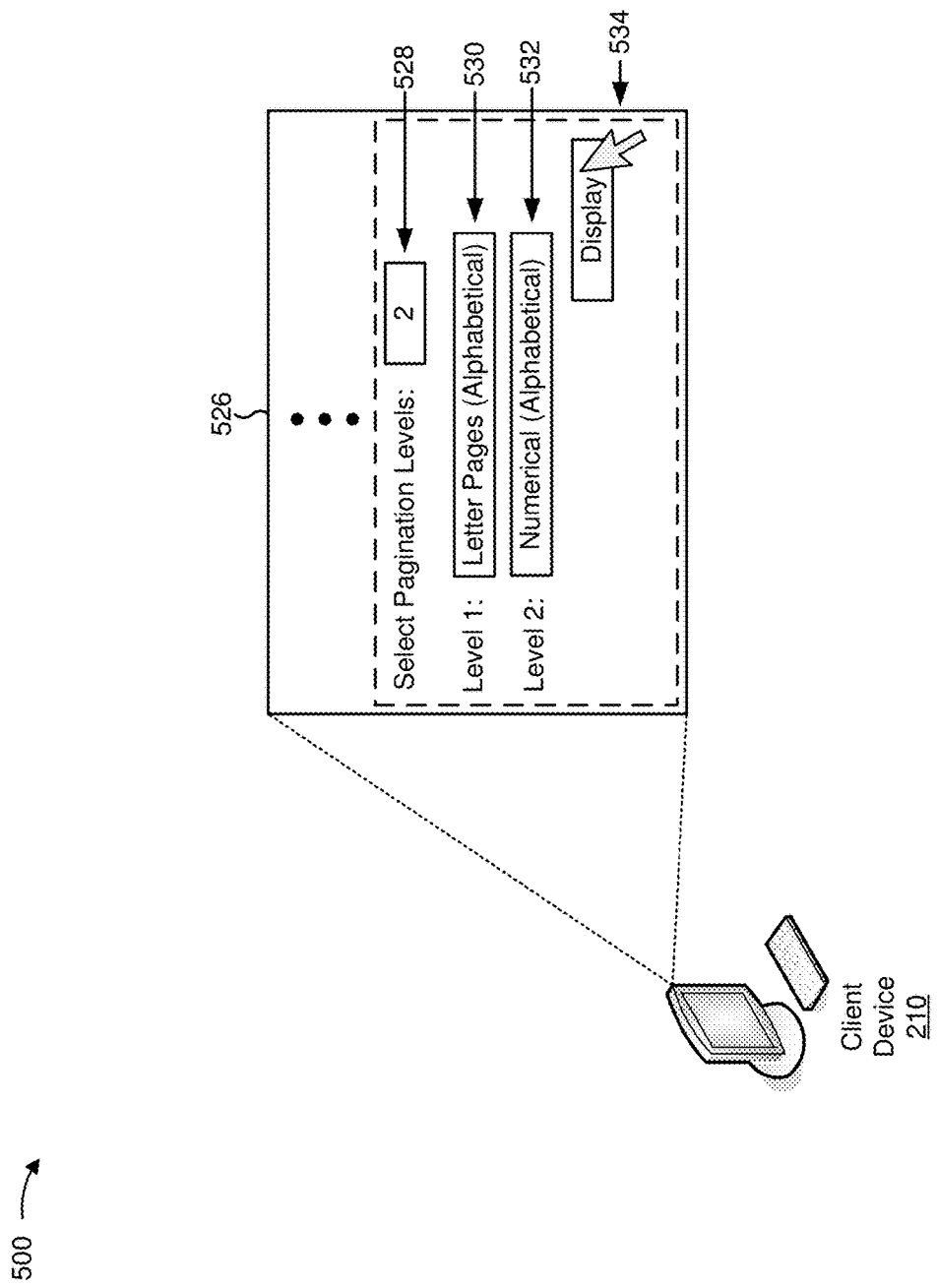

As shown in FIG. 5C, and by the reference number 526, client device 210 provides the user interface associated with configuring the set of parameters associated with pagination. As shown by reference number 528, the quantity of pagination levels is altered to another quantity (e.g., 2). As shown by the reference number 530, client device 210 provides an indication of a parameter for generating the first level of pagination (e.g., "Letter Pages (Alphabetical)"). Assume that the parameter indicates a letter pagination (e.g., a first page, "A," a second page, "B," etc.) ordered alphabetically (e.g., "A," "B," etc.). As shown by reference number 532, client device 210 provides an indication of another parameter for generating the second level of pagination (e.g., "Numerical (Alphabetical)"). As shown by reference number 534, based on a user interaction, client device 210 paginates data set 502 based on the parameters.

Figure 5D:
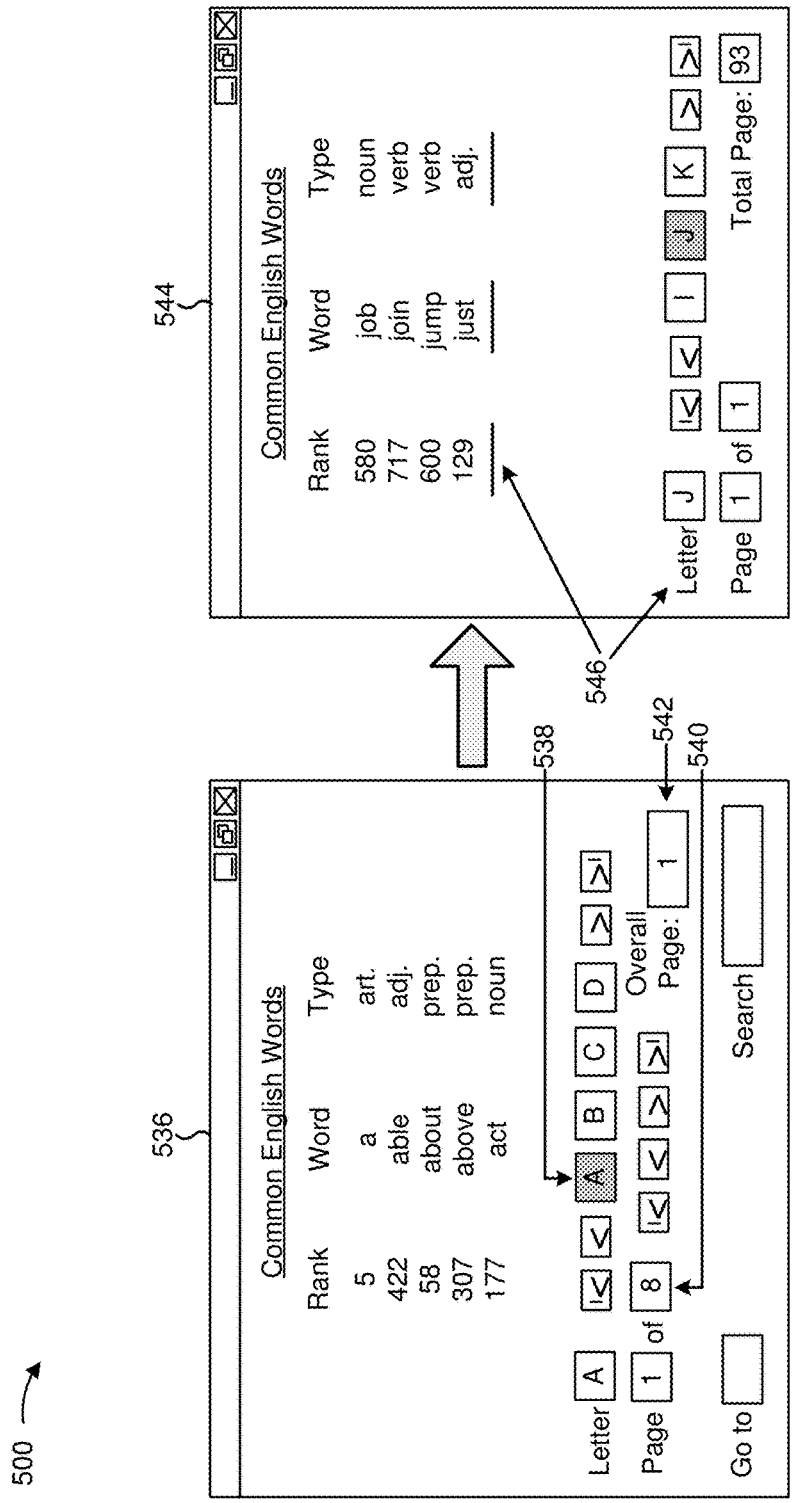

As shown in FIG. 5D, and by the reference number 536, client device 210 provides a user interface for viewing data set 502 via the second pagination generated based on the parameters. As shown by the reference number 538, user interface view 522 shows a first page of a set of pages associated with the letter "A." As shown by reference number 540, client 210 provides a user interface element indicating a quantity of pages in the set of pages associated with the letter "A" (e.g., 8). As shown by reference number 542, client device 210 provides a page location among all pages associated with data set 502.

A user may utilize the buttons associated with the letter pages to move to a desired set of pages associated with a particular letter and without being required to scroll through all pages between the current page and the set of pages associated with the particular letter, thereby reducing a quantity of time required to view a particular entry of data set 502 relative to view 522 which utilizes only a single level of pagination. Moreover, by reducing user interaction with the user interface, computing resources that are devoted to the user interface may be reduced relative to a single level of pagination.

As further shown in FIG. 5D, and by the reference number 544, based on a user interaction with a button, client device 210 provides a page of a set of pages associated with the letter "J." As shown, data set 502 includes only 4 data entries associated with the letter "J," however the user interface is configured to provide 5 data entries per page. As shown by reference number 546, client device 210 causes the user interface to provide an indication that the letter "J" is associated with only a single page, and provides a delimiter (e.g., a set of dashes) indicating an empty space reserved for a data entry at which a data entry is not provided.

Figure 5E:
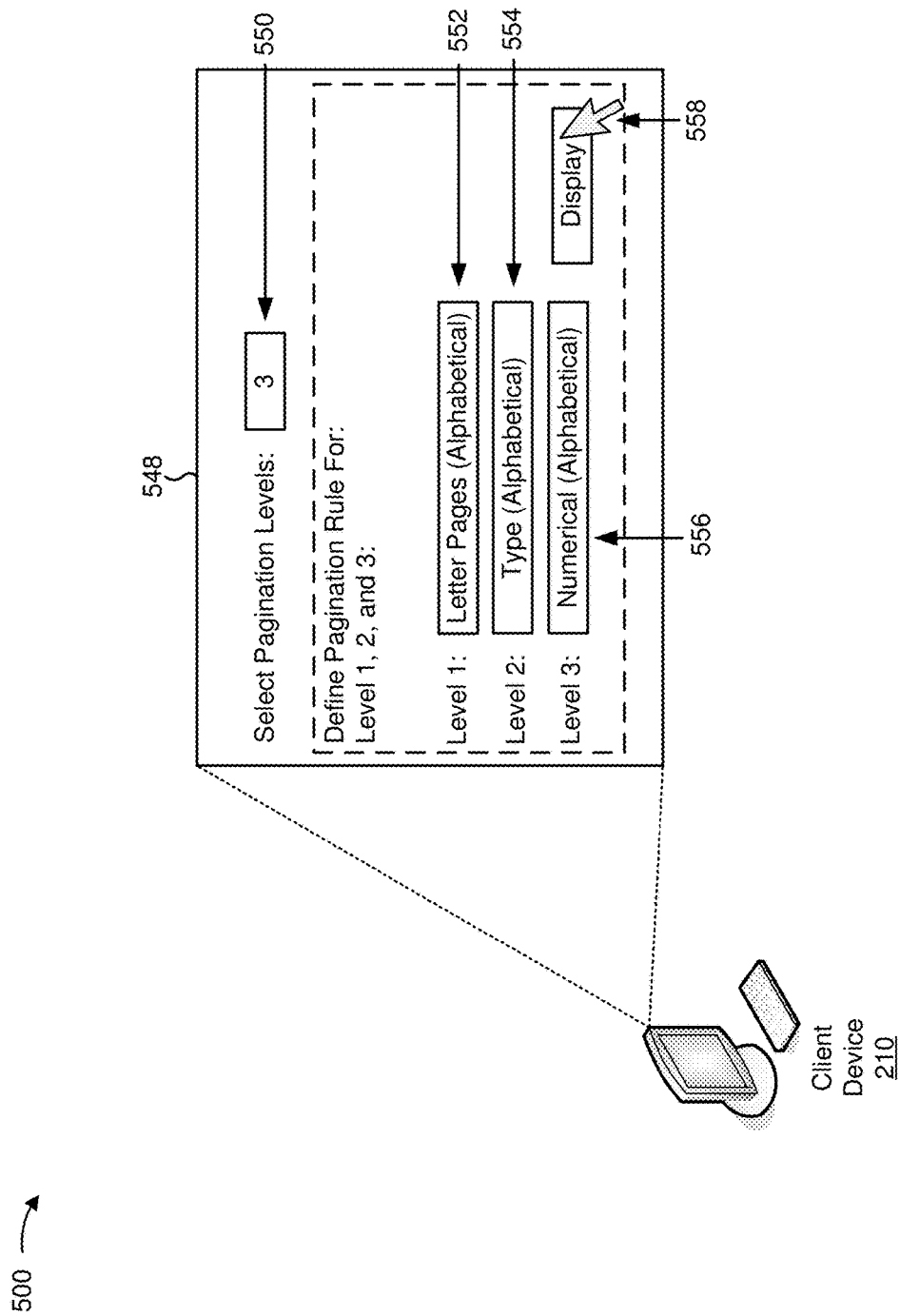

As shown in FIG. 5E, and by reference number 548, client device 210 provides the user interface associated with configuring the set of parameters associated with pagination. As shown by reference number 550, the quantity of pagination levels is altered to another quantity (e.g., 3). As shown by reference number 552, client device 210 provides an indication of a parameter for generating the first level of pagination (e.g., "Letter Pages (Alphabetical)"). As shown by reference number 554, client device 210 provides an indication of a parameter for generating the second level of pagination (e.g., "Type (Alphabetical)"). Assume that the parameter indicates that each letter set of pages is divided into a type of pagination based on the type field (e.g., "Art.," "Conj.," etc.) ordered alphabetically by the first letter of each type. As shown by the reference number 556, client device 210 provides an indication of a parameter for generating the third level of pagination (e.g., "Numerical (Alphabetical)"). Assume that the parameter indicated that each type set of pages is divided into a set of numerical pages (e.g., "1," "2," etc.) with data entries ordered in the set of numerical pages alphabetically based on the word field. As shown by reference number 558, based on a user interaction, client device 210 paginates data set 502 based on the parameters.

Figure 5F:
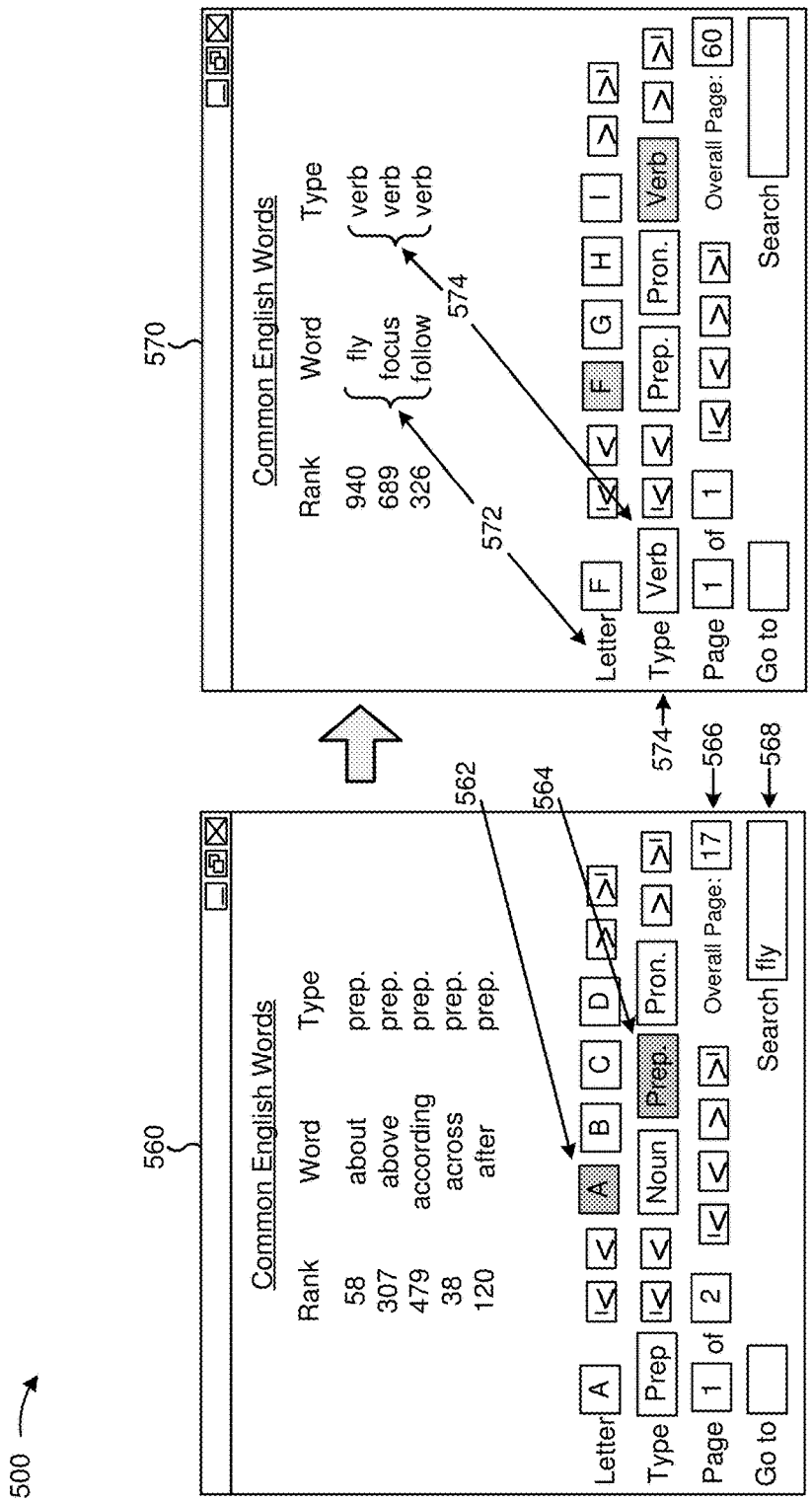

As shown in FIG. 5F, and by reference number 560, client device 210 provides a user interface for viewing data set 502 via the third pagination generated based on the parameters. As shown by reference number 562, user interface view 560 shows a first group of sets of pages associated with the letter "A." as shown by reference number 564, user interface view 560 shows a first set of pages, of the first group of sets of pages, associated with the type "Prep." (e.g., a preposition). As shown by reference number 566, client device 210 provides a user interface element associated with showing a page location among all pages of the third pagination (e.g., "17"). As shown by reference number 568, client device 210 may receive input of a search term (e.g., a word to be search for in data set 502).

As further shown in FIG. 5F, and by reference number 570, client device 210 may provide, for display, a page that includes the search term. As shown by reference numbers 572 and 574, the provided page is associated with the letter "F" and the type "verb" and includes the search term.

As indicated above, FIGS. 5A-5F are provided merely as an example. Other examples are possible and may differ from what was described with regard to FIGS. 5A-5F.

In this way, client device 210 may generate a configurable pagination, such as for a developer, a user, or the like. By using a configurable framework rather than custom code, client device 210 may reduce time and errors associated with generating the pagination relative to requiring a developer to custom code the pagination. By using a multi-level pagination, client device 210 may provide a better user experience (e.g., by contextually organizing a set of data entries) and reduce computing resources for the pagination (e.g., by reducing user interaction required to access a desired data entry) relative to a single level pagination.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly constructed as hardware, firmware, and/or a combination of hardware and software.

Some implementations are described herein connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or the methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be constructed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeable with "one or more." Where only one item is intended, the term "one" or similar language is used. Also, as used herein, the terms "has," "have," "having," or the like are intended to be open ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive a set of data entries;
parse the set of data entries to:
identify one or more field types for each entry within the set of data entries, and
determine a quantity of data entries in the set of data entries;

receive a trigger to generate a pagination for the set of data entries,
    the quantity of the data entries in the set of data entries satisfying a threshold quantity;
provide a user interface identifying a set of parameters associated with generating the pagination for the set of data entries;
receive from the user interface a parameter value corresponding to a quantity of pagination levels,
    the parameter value corresponding to the quantity of pagination levels being a value of at least two or more pagination levels;
receive from the user interface a parameter value corresponding to a pagination type for each pagination level of the at least two or more pagination levels,
    the parameter value corresponding to the pagination type being based on one or more identified field types;
paginate the set of data entries into a plurality of pages of the pagination based on the parameter value corresponding to the quantity of pagination levels and the parameter value corresponding to the pagination type by:
    allocating the set of data entries into particular pages for each particular pagination level of the two or more pagination levels as specified by the parameter value corresponding to the quantity of pagination levels,
        the allocated set of data entries being ordered by the parameter value of the pagination type assigned to a particular pagination level,
        the paginated set of data entries including an allocated data entry being placed into a page at a first pagination level of the at least two or more pagination levels,
        the page at the first pagination level being further included in a set of pages at a second pagination level of the at least two or more pagination levels;
    generate a page that includes one of the particular pages including allocated data entries and further including in the generated page, one or more user interface elements that can reference one or more other pages of the particular pages;
    detect a user interaction with a user interface element of the one or more user interface elements that references one of the one or more other pages of the particular pages; and
cause the one of the one or more other pages of the particular pages, and allocated data entries corresponding to the one of the one or more other pages of the particular pages, to be displayed.

2. The device of claim 1, where the pagination type associated with the pagination level of the at least two or more pagination levels is associated with at least one of:
a field of the set of data entries,
a numerical aspect associated with the set of data entries,
an alphabetical aspect of the set of data entries, or
a category associated with the set of data entries.

3. The device of claim 1, where the one or more processors are further to:
alter an appearance of a button in the user interface in which the pagination is displayed to provide information regarding a particular page that is being displayed in the user interface.

4. The device of claim 1, where the one or more processors are further to:
generate program code for the pagination,
    the program code being associated with facilitating utilization of the pagination within an application; and
associate the program code with one or more modules of the application,
    the one or more modules being associated with providing the pagination for display.

5. The device of claim 1, where the one or more processor are further to:
generate program code for the pagination,
    the program code being associated with facilitating utilization of the pagination in at least two of:
        a desktop environment,
        a web environment, or
        a mobile environment.

6. The device of claim 1, where the one or more processors are further to:
make program code accessible to one or more modules of an application to cause the pagination to be accessible in the one or more modules.

7. The device of claim 1, where the one or more processors are further to:
cause the user interface to include a go to function;
determine that the go to function is executed,
    the user interface receiving a page identifier to execute the go to function;
identify another page, based on the page identifier; and
cause the other page to be displayed within the user interface.

8. The device of claim 1, where the one or more processors are further to:
cause the user interface to include a search function;
determine that the search function is executed,
    the user interface receiving a search term to execute the search function;
identify another data entry based on the search term;
determine another page that includes the other data entry; and
cause the other page to be displayed within the user interface.

9. A computer-readable medium storing instructions, the instructions comprising:
one or more instructions that, when executed by one or more processors, cause the one or more processors to:
receive a set of data entries;
parse the set of data entries to:
    identify one or more field types for each entry within the set of data entries, and
    determine a quantity of data entries in the set of data entries;
receive a trigger to generate a pagination for the set of data entries,
    the quantity of the data entries in the set of data entries satisfying a threshold quantity;
provide a user interface identifying a set of parameters associated with generating the pagination for the set of data entries;
receive, from the user interface, a parameter value corresponding to a quantity of pagination levels associated with pagination,
    the parameter value corresponding to the quantity of pagination levels being a value of at least two or more pagination levels;

receive, from the user interface, a parameter value corresponding to a pagination type for each pagination level of the at least two or more pagination levels,
the parameter value corresponding to the pagination type being based on one or more identified field types;
paginate the set of data entries into a plurality of pages of the pagination based on the parameter value corresponding to the quantity of pagination levels and the parameter value corresponding to the pagination type by:
allocating the set of data entries into particular pages for each particular pagination level of the at least two or more pagination levels as specified by the parameter value corresponding to the quantity of pagination levels,
the allocated set of data entries being ordered by the parameter value of the pagination type assigned to a particular pagination level,
the paginated set of data entries including an allocated data entry, being placed into a page at a first pagination level of the at least two or more of pagination levels,
the page at the first pagination level being further included in a set of pages at a second pagination level of the at least two or more pagination levels;
generate a page that includes one of the particular pages including allocated data entries and further including in the generated page, one or more user interface elements that can reference one or more other pages of the particular pages;
detect a user interaction with a user interface element of the one or more user interface elements that references the one of the one or more other pages of the particular pages; and
cause the one of the one or more other pages of the particular pages, and allocated data entries corresponding to the one of the one or more other pages of the particular pages, to be displayed.

10. The computer-readable medium of claim 9, where the one or more instructions, when executed by the one or more processors, further cause the one or more processors to:
generate program code for the pagination,
the program code being associated with facilitating utilization of the pagination within an application; and
associate the program code with one or more modules of the application,
the one or more modules being associated with providing the pagination for display.

11. The computer-readable medium of claim 9, where the one or more instructions, when executed by the one or more processors, further cause the one or more processors to:
cause the user interface to include a go to function;
determine that the go to function is executed,
the user interface receiving a page identifier to execute the go to function;
identify another page, based on the page identifier; and
cause the other page to be displayed within the user interface.

12. The computer-readable medium of claim 9, where the one or more instructions, when executed by the one or more processors, further cause the one or more processors to:
cause the user interface to include a search function;
determine that the search function is executed,
the user interface receiving a search term to execute the search function;
identify another data entry based on the search term;
determine another page that includes the other data entry; and
cause the other page to be displayed within the user interface.

13. The computer-readable medium of claim 9, where the pagination type associated with the pagination level of the at least two or more pagination levels is associated with at least one of:
a field of the set of data entries,
a numerical aspect associated with the set of data entries,
an alphabetical aspect of the set of data entries, or
a category associated with the set of data entries.

14. A method, comprising:
receiving, by a device, a set of data entries;
parsing, by the device, the set of data entries to:
identify one or more field types for each entry within the set of data entries, and
determine a quantity of data entries in the set of data entries;
receiving, by the device, a trigger to generate a pagination for the set of data entries,
the quantity of the data entries in the set of data entries satisfying a threshold quantity of data entries;
providing, by the device, a user interface identifying a set of parameters associated with generating the pagination for the set of data entries,
receiving, by the device and from the user interface, a parameter value corresponding to a quantity of pagination levels,
the parameter value corresponding to the quantity of pagination levels being a value of at least two or more pagination levels;
receiving, by the device and from the user interface, a parameter value corresponding to a pagination type for each pagination level of the at least two or more pagination levels,
the parameter value corresponding to the pagination type being based on one or more identified field types;
paginating, by the device, the set of data entries into a plurality of pages of the pagination based on the parameter value corresponding to the quantity of pagination levels and parameter value corresponding to the pagination type by:
allocating the set of data entries into particular pages for each particular pagination level of the two or more pagination levels as specified by the parameter value corresponding to the quantity of pagination levels,
the allocated set of data entries being ordered by the parameter value of the pagination type assigned to a particular pagination level,
the paginated set of data entries including an allocated data entry being placed into a page at a first pagination level of the at least two or more pagination levels,
the page at the first pagination level being further included in a set of pages at a second pagination level of the two or more pagination levels;
generating, by the device, a page that includes one of the particular pages including allocated data entries and further including in the generated page, one or more user interface elements that can reference one or more other pages of the particular pages;

detecting, by the device, a user interaction with a user interface element of the one or more user interface elements that references one of the one or more other pages of the particular pages;

causing, by the device, the one of the one or more other pages of the particular pages, and allocated data entries corresponding to the one of the one or more other pages of the particular pages, to be displayed; and generating, by the device, program code associated with the pagination based on paginating the set of data entries.

15. The method of claim 14, further comprising:

making the program code accessible to one or more modules of an application to cause the pagination to be accessible in the one or more modules.

16. The method of claim 14, where the set of pages is associated with a corresponding set of letters of an alphabet; and where the method further comprises:

causing the generated page to be displayed within the user interface, the user interface including a set of buttons corresponding to a subset of the set of letters of the alphabet, the generated page being associated with a particular letter of the alphabet;

detecting the user interaction with the user interface;

causing another page, associated with another letter of the alphabet, to be displayed within the user interface; and altering the set of buttons to correspond to a different subset of the set of letters of the alphabet based on causing the other page to be displayed.

17. The method of claim 14, further comprising:

altering an appearance of a button in the user interface in which the pagination is displayed to provide information regarding a particular page that is being displayed in the user interface.

18. The method of claim 14, further comprising:

generating the program code for utilization in at least two of:

a desktop environment, a web environment, or a mobile environment.

19. The method of claim 14, where the pagination type associated with the pagination level of the at least two or more pagination levels is associated with at least one of:

a field of the set of data entries, a numerical aspect associated with the set of data entries, an alphabetical aspect of the set of data entries, or a category associated with the set of data entries.

* * * * *